United States Patent
Takahashi et al.

[11] Patent Number: 6,145,304
[45] Date of Patent: Nov. 14, 2000

[54] DETERIORATION DETERMINATION APPARATUS FOR EXHAUST EMISSION CONTROL DEVICE OF INTERNAL COMBUSTION ENGINE

[75] Inventors: Hideaki Takahashi; Kimiyoshi Nishizawa, both of Kanagawa-ken, Japan

[73] Assignee: Nissan Motor Co., Ltd., Yokohama, Japan

[21] Appl. No.: 09/220,382

[22] Filed: Dec. 24, 1998

[30] Foreign Application Priority Data

Dec. 26, 1997 [JP] Japan ................................. 9-358754

[51] Int. Cl.[7] ...................................................... F01N 3/00
[52] U.S. Cl. ................................. 60/277; 60/276; 60/285
[58] Field of Search ............................... 60/276, 277, 285

[56] References Cited

U.S. PATENT DOCUMENTS

| | | | |
|---|---|---|---|
| 4,739,614 | 4/1988 | Katsuno et al. | 60/276 |
| 5,159,810 | 11/1992 | Grutter et al. | 60/274 |
| 5,301,501 | 4/1994 | Shimizu et al. | 60/277 |
| 5,357,750 | 10/1994 | Ito et al. | 60/274 |
| 5,509,267 | 4/1996 | Ito et al. | 60/274 |
| 5,522,219 | 6/1996 | Orzel et al. | 60/274 |
| 5,836,156 | 11/1998 | Watabe et al. | 60/277 |
| 5,887,421 | 3/1999 | Mitsutani | 60/276 |
| 5,983,629 | 11/1999 | Sawada | 60/276 |
| 6,029,441 | 2/2000 | Mizuno et al. | 60/276 |

FOREIGN PATENT DOCUMENTS

| | | |
|---|---|---|
| 0 727 568 | 6/1996 | European Pat. Off. . |
| 2 739 139 | 3/1997 | France . |
| 6-66131 | 3/1994 | Japan . |
| 7-144119 | 6/1995 | Japan . |

OTHER PUBLICATIONS

Patent Abstracts of Japan, vol. 1997, No. 02, 02/28/1997 (JP 08 261042, 10/08/1996).

Primary Examiner—Thomas Denion
Assistant Examiner—Diem Tran
Attorney, Agent, or Firm—Foley & Lardner

[57] ABSTRACT

The disclosed deterioration determination apparatus for an exhaust emission control device used for an internal combustion engine is intended for the exhaust emission control device comprising the first catalyst, arranged in the exhaust passage of the engine, for conducting a catalytic action with respect to exhaust gas passed through the exhaust passage and the second catalyst, arranged in the downstream of the first catalyst in the exhaust passage, for conducting a catalytic action with respect to the exhaust gas passed through the exhaust passage. The deterioration determination apparatus includes the first sensor, arranged between the first catalyst and second catalyst, for detecting information about the air-fuel ratio of the exhaust gas passed through the exhaust passage; the second sensor, arranged in the downstream of the second catalyst, for detecting information about the air-fuel ratio of the exhaust gas passed through the exhaust passage; and a control unit. The control unit measures the amplitude of the air-fuel ratio of the exhaust gas from the information detected by the first sensor, while feedback controlling an air-fuel ratio of mixture gas supplied to the engine based on the information detected by the second sensor, and determines whether or not the second catalyst deteriorates based on the measured amplitude of the air-fuel ratio.

9 Claims, 9 Drawing Sheets

DETERIORATION DETERMINATION APPARATUS FOR EXHAUST EMISSION CONTROL DEVICE OF INTERNAL COMBUSTION ENGINE

BACKGROUND OF THE INVENTION

1. Field of the Invention

The present invention relates to a deterioration determination apparatus for an exhaust emission control device used for internal combustion engine and, in particular, relates to a deterioration determination apparatus for an exhaust emission control device comprising catalysts such as a so-called three way catalyst and an HC adsorbing catalyst.

2. Description of the Related Art

There is conventionally known an HC adsorbent characterized by adsorbing unburned hydrocarbon (to be referred to as simply "HC") which is generated at low temperature, for example, at the cold start of the internal combustion engine such as gasoline engine (to be referred to as simply "engine" hereinafter) and desorbing the adsorbed HC at high temperature.

As a deterioration determination apparatus for an exhaust emission control device comprising such an HC adsorbent, there is proposed an apparatus for an exhaust emission control device comprising an HC adsorbent in the upstream of a so-called three way catalyst provided in an exhaust passage, as disclosed in Japanese Patent Application Laid-open No. 6-66131.

More specifically, in the deterioration determination apparatus of this type, so-called $O_2$ sensors for detecting whether the air-fuel ratio of exhaust gas is on the lean side or on the rich side with respect to a theoretical air-fuel ratio are provided in the upstream of the HC adsorbent, i.e., between the engine and the HC adsorbent, and in the downstream of the HC adsorbent, i.e., between the HC adsorbent and the three way catalyst, respectively.

In this deterioration determination apparatus, the so-called inversion frequency ratio of the outputs of both of the $O_2$ sensors in the upstream and downstream is obtained and the deterioration determination of the adsorption capability of the HC adsorbent is made based on the inversion frequency ratio.

It is noted that, in this deterioration determination apparatus, the feedback controlling of the air-fuel ratio of mixture gas supplied to the engine, i.e., so-called air-fuel ratio feedback control is also conducted based on the output of the upstream $O_2$ sensor.

There is also known an HC adsorbing catalyst characterized by adsorbing the HC and desorbing the adsorbed HC at high temperature as the HC adsorbent and also characterized by having a catalytic action of converting the desorbed HC into an innocuous substance.

Some of the exhaust emission control devices provided with an HC adsorbing catalyst as well as the three way catalyst have a structure in which an HC adsorbing catalyst is provided in the downstream of the three way catalyst provided in the exhaust passage in consideration that the HC adsorbing catalyst has a low degree of heat endurance ability, as disclosed in Japanese Patent Application Laid-Open No. 7-144119.

In the exhaust emission control device of this type, if the engine has just been cold and the three way catalyst is inert, the HC which cannot be converted into an innocuous substance by the inert three way catalyst is adsorbed first by the HC adsorbing catalyst.

After the three way catalyst is activated, the activated three way catalyst converts the HC into an innocuous substance. Thereafter, if the HC adsorbing catalyst is activated finally, then the activated HC adsorbing catalyst converts the HC adsorbed by the catalyst into an innocuous substance.

In the above-stated exhaust emission control device, the feedback controlling of the air-fuel ratio of the adsorbed mixture gas is conducted by using the $O_2$ sensor provided in the upstream of the three way catalyst in accordance with timing at which the three way catalyst is activated.

Needless to say, with the exhaust emission control device provided even with the HC adsorbing catalyst of this type, if the HC adsorbing catalyst deteriorates, there is a possibility that the HC is not sufficiently adsorbed or, if adsorbed, the absorbed HC can not be converted into an innocuous substance to a sufficient degree. The need of a deterioration determination apparatus capable of determining whether the HC adsorbing catalyst deteriorates with high accuracy is high and demands for realizing such an apparatus are arising.

Furthermore, as for the above-stated exhaust emission control device, if the determination of the deterioration of not only the HC adsorbing catalyst but also of various catalysts such as a three way catalyst can be made, more accurate determination of the deterioration of the exhaust emission capability can be made. For that reason, demands are also arising for the realization of a deterioration determination apparatus capable of determining not only the HC adsorbing catalyst but also a three way catalyst and the like.

SUMMARY OF THE INVENTION

It is therefore an object of the present invention to provide a deterioration determination apparatus for an exhaust emission control device used for an internal combustion engine such as a gasoline engine, which apparatus is capable of accurately determining whether a HC absorbing catalyst or the like deteriorates.

To achieve the above object, the inventor of the present invention conducted various examinations to determine whether an HC adsorbing catalyst deteriorates in an exhaust emission control device having the HC adsorbing catalyst in the downstream of a three way catalyst in the exhaust passage of the engine, using a structure in which three $O_2$ sensors are provided in the following three points, respectively. That is, the three $O_2$ sensors are provided in the upstream of the three way catalyst, i.e., between the engine and the three way catalyst, in the upstream of the HC adsorbing catalyst, i.e., between the three way catalyst and the HC adsorbing catalyst, and in the downstream of the HC adsorbing catalyst, respectively.

With such a structure, however, if the deterioration determination of the HC adsorbing catalyst was made based on the outputs of the $O_2$ sensors both in the upstream and downstream of the HC adsorbing catalyst, while feedback controlling the air-fuel ratio of the intake mixture gas based on the output of the $O_2$ sensor in the upstream of the HC adsorbing catalyst, then the following disadvantages were discovered.

Specifically, with this structure, the cycle of the output of the $O_2$ sensor in the upstream of the HC adsorbing catalyst, i.e., between the three way catalyst and the HC adsorbing catalyst, possesses characteristics in that it is greatly influenced by the deterioration degree of the $O_2$ storage capability of the three way catalyst provided in the upstream of the HC adsorbing catalyst, that is, it is greatly influenced by the deterioration degree of the catalytic action of the three way catalyst.

On the other hand, the inversion frequency ratio of the output of the $O_2$ sensor in the upstream of the HC adsorbing catalyst, i.e., between the three way catalyst and the HC adsorbing catalyst, and the output of the $O_2$ sensor in the downstream of the HC adsorbing catalyst possesses characteristic of changing in accordance with the cycle of the output of the $O_2$ sensor in the upstream of the HC adsorbing catalyst.

For that reason, if it is determined whether the HC adsorbing catalyst deteriorates based on the output of the $O_2$ sensor in the upstream of the HC adsorbing catalyst which is dependent on the deterioration degree of the three way catalyst and on the output of the $O_2$ sensor in the downstream of the HC adsorbing catalyst, or more specifically, using their inversion frequency ratio, then the result of the determination depends on the deterioration degree of the three way catalyst.

As a result, with that structure, it is difficult to determined whether the HC adsorbing catalyst deteriorates with high accuracy without depending on the deterioration degree of the three way catalyst.

The inventor of the present invention made further examinations to enable the accurate deterioration determination of the HC adsorbing catalyst without depending on the deterioration degree of the three way catalyst, based on the structure of the exhaust emission control device comprising the HC adsorbing catalyst in the downstream of the three way catalyst.

To be specific, while feedback controlling the air-fuel ratio of the intake mixture gas using the output of the $O_2$ sensor in the downstream of the HC adsorbing catalyst, a so-called A/F sensor capable of obtaining a linear output by detecting the air-fuel ratio of exhaust gas, instead of the $O_2$ sensor capable of obtaining only the rich side output and the lean side output inverting with respect to each other around the theoretical air-fuel ratio of the exhaust gas, is provided in the upstream of the HC adsorbing catalyst, i.e., between the three way catalyst and the HC adsorbing catalyst. Using the A/F sensor, the amplitude of the air-fuel ratio corresponding to the peak-to-peak of the air-fuel ratio of the exhaust gas flowing between the three way catalyst and the HC adsorbing catalyst was measured under various conditions. Here, the air-fuel ratio of exhaust gas corresponds to the ratio of the concentration of $O_2$ within the exhaust gas to the concentration of HC, CO and $CO_2$. Also, the theoretical air-fuel ratio of the exhaust gas means the air-fuel ratio of the exhaust gas when mixture gas with the theoretical air-fuel ratio for complete combustion is burned.

It was found out that the amplitude of the air-fuel ratio of the exhaust gas with the above-stated structure correctly corresponds to the deterioration degree of the HC adsorbing catalyst without depending on the deterioration degree of the three way catalyst.

More specifically, if the amplitude of the air-fuel ratio of the exhaust gas between the three way catalyst and the HC adsorbing catalyst is large, the deterioration degree of the HC adsorbing catalyst is low. Also, if the amplitude of the air-fuel ratio of the exhaust gas between the three way catalyst and the HC adsorbing catalyst is small, the deterioration degree of the HC adsorbing catalyst is high. Here, the deterioration degree of the three way catalyst was evaluated in correspondence with the $O_2$ storage capability of the three way catalyst and the deterioration degree of the HC adsorbing catalyst was evaluated in correspondence with the $O_2$ storage capability of the HC adsorbing catalyst.

As described above, the structure which was attained by the present invention by taking notes of the magnitude of the amplitude of the air-fuel ratio of the exhaust gas between the three way catalyst arranged in the upstream of the exhaust passage of the engine and the HC adsorbing catalyst arranged in the downstream of the exhaust passage of the engine, makes it possible to measure and determine the deterioration degree of the $O_2$ storage capability of the catalyst in the downstream of the exhaust passage of the engine without depending on the $O_2$ storage capability of the catalyst in the upstream of the exhaust passage of the engine.

In other words, in the exhaust emission control device wherein a catalyst having a predetermined $O_2$ storage capability is arranged in the upstream of the exhaust passage of the engine and a catalyst having a predetermined $O_2$ storage capability is arranged in the downstream of the engine, a deterioration determination apparatus capable of determining the deterioration degree of the catalyst in the downstream without depending on that of the catalyst in the upstream, can be realized so as to use for the exhaust emission control device.

The deterioration determination apparatus for the exhaust emission control device in the internal combustion engine according to the present invention has been achieved based on the novel, technical knowledge of the inventor of the present invention as described above. The deterioration determination apparatus is intended for an exhaust emission control device comprising the first catalyst arranged in the exhaust passage of the internal combustion engine and conducting a catalytic action with respect to the exhaust gas passed through the exhaust passage, and the second catalyst arranged in the downstream of the first catalyst in the exhaust passage of the internal combustion engine and conducting a catalytic action with respect to the exhaust passed through the exhaust passage. The apparatus comprises the first sensor, arranged between the first catalyst and the second catalyst in the exhaust passage of the internal combustion engine, for detecting information about the air-fuel ratio of the exhaust gas passed through the exhaust passage; the second sensor, arranged in the downstream of the second catalyst, for detecting information about the air-fuel ratio of the exhaust gas passed through the exhaust passage; control means for feedback controlling an air-fuel ratio of mixture gas supplied to the internal combustion engine based on the information detected by the second sensor; measurement means for measuring the amplitude of the air-fuel ratio of the exhaust gas from the information detected by the first sensor while the control means is conducting feedback control; and determination means for determining whether or not the second catalyst deteriorates based on the amplitude of the air-fuel ratio measured by the measurement means.

With the above-stated structure, it is possible to determine the deterioration degree of the catalyst in the downstream of the exhaust passage without depending on the deterioration degree of the catalyst in the upstream of the exhaust passage and to thereby accurately determine whether the catalyst in the downstream deteriorates.

More specifically, regarding the determination means, its determination is more suited when it is capable of determining, from comparison of an average air-fuel ratio amplitude with a predetermined reference value, that the second catalyst deteriorates if the average amplitude is not more than the reference value, since it is capable of accurately determining whether the catalyst in the downstream deteriorates, thereby.

On the other hand, the determination means may determine, from comparison of the average amplitude obtained every time the amplitude of the air-fuel ratio is inverted with a predetermined pair of determination values, that the second catalyst deteriorates if the amplitude average is not more than the smaller value of the pair of determination values, and that the second catalyst does not deteriorate if the amplitude average is not less than the larger value of the pair of the determination values.

With the above-stated structure, it is possible to make earlier deterioration determination such as to determine whether the catalyst in the downstream deteriorates while measuring the amplitude of the air-fuel ratio at the first measurement time, plainly speaking.

As the second catalyst in the deterioration determination apparatus for the exhaust emission control device of the internal combustion engine according to the present invention, catalysts such as a catalyst possessing characteristics so as to adsorb HC within the exhaust gas passed through the exhaust passage when the temperature of the second catalyst is low, desorb the HC adsorbed by the second catalyst when the temperature of the second catalyst is high and purify the HC adsorbed by the second catalyst when the temperature of the second catalyst is equal to or higher than a catalyst activation temperature by its catalytic action, and a catalyst possessing characteristics so as to adsorb and desorb the HC as in the case of the above catalyst and also purify the HC, CO and $NO_x$ when the temperature of the second catalyst is equal to or higher than the catalyst activation temperature by its three way catalytic action, may be suitably employed, thereby making it possible to make accurate deterioration determination.

With the above-stated structure, it is possible to accurately determine the deterioration degree of the catalytic action of the HC adsorbing catalyst provided in the downstream and that of the catalytic action of purifying CO and $NO_x$ as well as the HC. Besides, it is possible to accurately determine the deterioration degree of the HC adsorbing action which is deteriorating at substantially the same pace as that of the deterioration of the catalytic action.

Moreover, as the first catalyst in the deterioration determination apparatus for the exhaust emission control device for the internal combustion engine according to the present invention, a catalyst possessing the three way catalytic action of purifying HC, CO and $NO_x$ when the temperature of the first catalyst is equal to or higher than the catalyst activation temperature and a catalyst possessing not only the above catalytic action but also the characteristics so as to adsorb the HC within the exhaust gas passed through the exhaust passage when the temperature of the first catalyst is low and desorb the HC within the exhaust gas passed through the exhaust passage when the temperature of the first catalyst is high, may be employed. It is possible to accurately determine whether the second catalyst in the downstream deteriorates without giving the influence of the deterioration degree of the catalytic action of the above-stated first catalyst.

As the first sensor in the deterioration determination apparatus for the exhaust emission control device in the internal combustion engine according to the present invention, a sensor which detects substantially linearly the air-fuel ratio of the emission gas passed through the exhaust passage may be suitably employed to ensure that the amplitude of the air-fuel ratio can be obtained.

As the second sensor in the deterioration determination apparatus for the exhaust emission control device in the internal combustion engine according to the present invention, a sensor which detects whether the air-fuel ratio of the exhaust gas passed through the exhaust passage is on the rich side or on the lean side with respect to the theoretical air-fuel ratio of the exhaust gas may be sufficiently employed.

DETAILED DESCRIPTION OF THE PREFERRED EMBODIMENTS

Embodiments of the present invention will now be described in detail with reference to the drawings.

First, description will be given to the first embodiment of the deterioration determination apparatus for the exhaust emission control used for the internal combustion engine according to the present invention.

Figure 1:
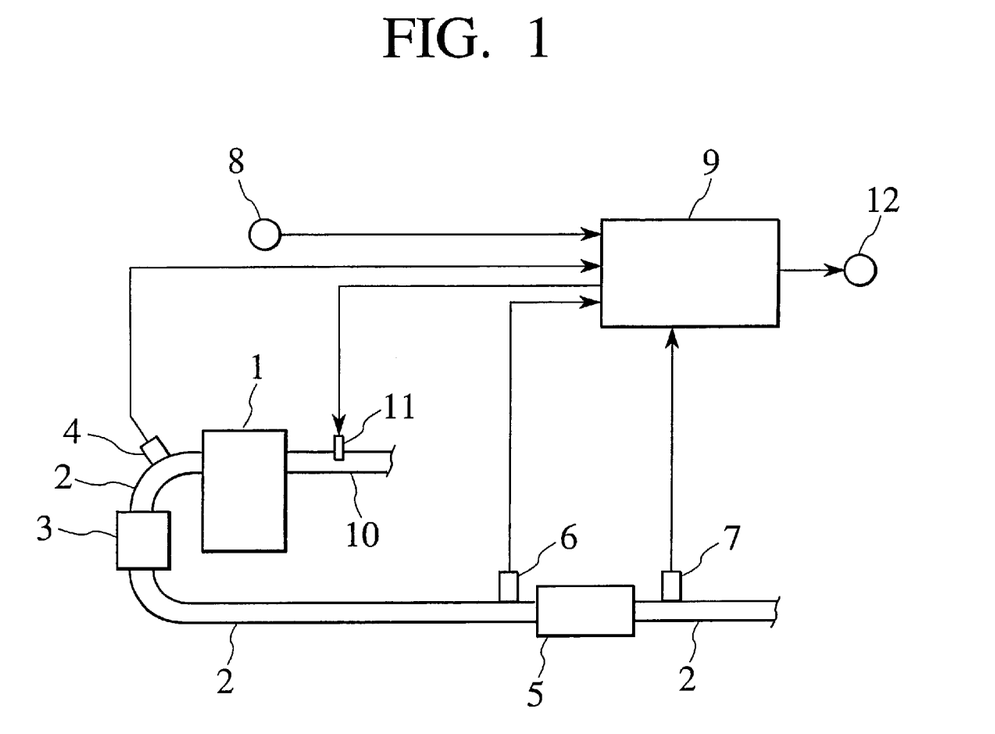
FIG. 1 is a diagram showing the structure of the first embodiment of a deterioration determination apparatus for an exhaust emission control device used for an internal combustion engine according to the present invention.

In FIG. 1, there are shown the first catalyst 3 provided in the upstream of an exhaust pipe 2 of an engine 1, an upstream sensor 4 provided between the engine 1 and the first catalyst 3 to the exhaust pipe 2, the second catalyst 5 provided in the downstream of the exhaust pipe 2 to the first catalyst 3, an intermediate sensor 6 provided between the first catalyst 3 and the second catalyst 5, a downstream sensor 7 provided in the downstream of the exhaust pipe 2 to the second catalyst 5, a crank angle sensor 8 for outputting a signal corresponding to the crank angle of the engine 1, a control unit 9 into which signals from the sensors 4, 6, 7 and 8 are inputted, and an indicator 12. The control unit 9 displays its determination result of the deterioration of the second catalyst 5, obtained while controlling the ejection quantity of the fuel of an injector 11 provided at the intake pipe 10 of the engine 1 so as to perform feedback control with respect to the air-fuel ratio of mixture gas supplied to the engine 1, in the indicator 12.

The first and second catalysts 3 and 5 are main elements of the exhaust emission control device of the engine 1, whereas the sensors 4, 6, 7 and 8 and the control unit 9 are main elements of the deterioration determination apparatus for this exhaust emission control device.

Figure 2:
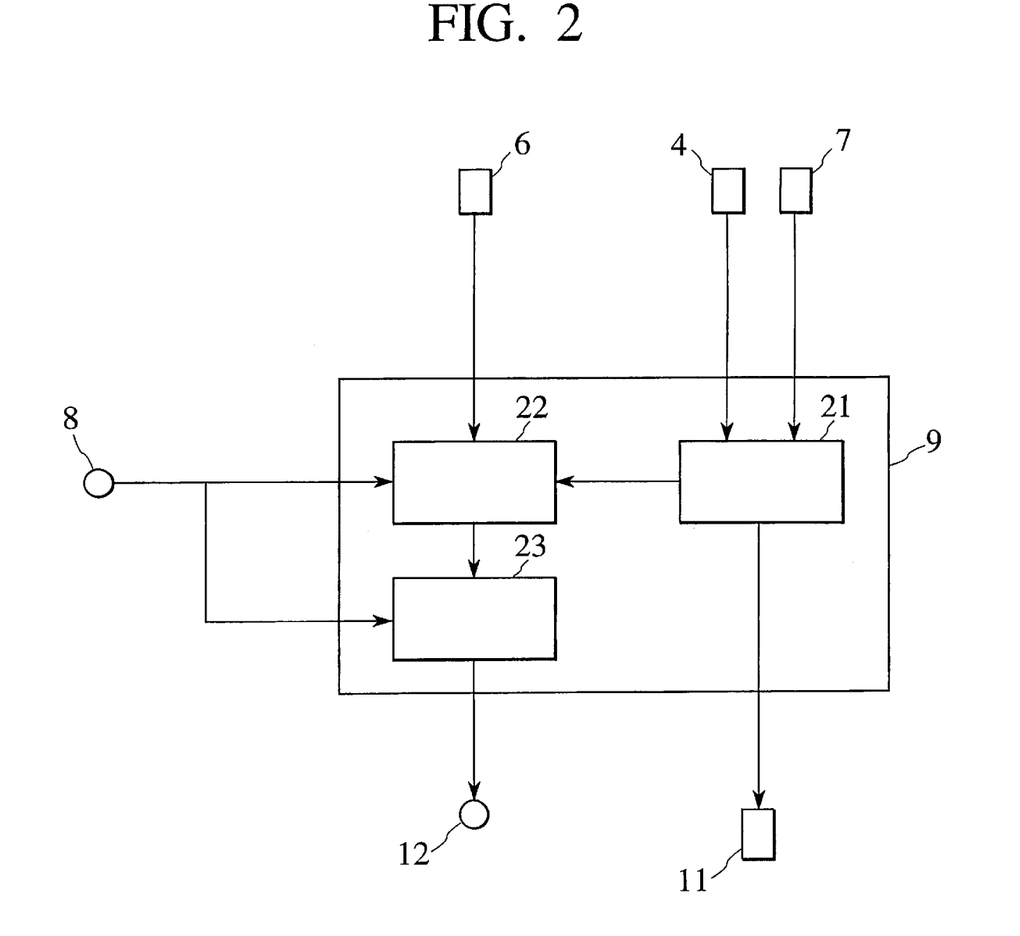
FIG. 2 is a block diagram showing the detail of a control unit in this embodiment.

Next, FIG. 2 illustrates the more detailed structure of the control unit 9. The control unit 9 has various functional blocks, i.e., an air-fuel ratio feedback control block 21 for feedback controlling the air-fuel ratio of the intake mixture gas supplied to the engine 1, an air-fuel ratio amplitude measurement block 22 for measuring the amplitude of the air-fuel ratio of the exhaust gas in case the air-fuel ratio feedback control block 21 conducts feedback control, and a deterioration determination block 23 for determining whether the catalyst in the exhaust emission control device deteriorates, based on the air-fuel ratio amplitude of the exhaust gas measured by the air-fuel ratio amplitude measurement block 22.

Description will be given to where the output signals of the sensors 4, 6, 7 and 8 are inputted. The output signal from the upstream $O_2$ sensor 4 and that from the downstream $O_2$ sensor 7 are appropriately inputted into the air-fuel ratio feedback control block 21. The output signal from the intermediate sensor, i.e., A/F sensor 6 is inputted into the air-fuel ratio amplitude measurement block 22. The output signal from the crank angle sensor 8 is inputted into the air-fuel ratio amplitude measurement block 22 and the deterioration determination block 23, respectively.

More specifically, a three way catalyst for converting HC, CO and $NO_x$ contained in the exhaust gas into innocuous substances and purifying the exhaust gas is used as the first catalyst 3. An HC adsorbing catalyst for adsorbing HC when the temperature of the engine is low such as at the cold start of the engine, that is, when the temperature of the exhaust gas is low, desorbing the adsorbed HC when the temperature of the engine is high and the temperature of the exhaust gas is high, converting the HC into an innocuous substance under the presence of CO and $NO_x$ and purifying the exhaust gas during desorbing the HC, is used as the second catalyst 5. An $O_2$ sensor for binary-determining whether the air-fuel ratio of the exhaust gas is on the rich side or on the lean side in relation to the theoretical air-fuel ratio of the exhaust gas, is used as the upstream sensor 4. An A/F sensor for detecting the air-fuel ratio of the exhaust gas substantially linearly is used as the intermediate sensor 6. An $O_2$ sensor is used as the downstream sensor 7 as in the case of the upstream sensor 4.

The exhaust purification action or catalytic action will next be described. As for the purification action for purifying HC within the exhaust gas, the HC in the exhaust gas is first adsorbed by the HC adsorbing catalyst 5 since the three way catalyst 3, which is inert while the temperature of the exhaust gas is low, is incapable of purifying the exhaust gas. Next, when the temperature of the exhaust gas becomes as high as about 300° C. and the three way catalyst 3 is activated, HC is converted into an innocuous substance by the three way catalyst 3 and the HC adsorbed by the HC adsorbing catalyst 5 which is activated later is converted into an innocuous substance while the control unit 9 is performing the air-fuel ratio feedback control with respect to the air-fuel ratio of the intake gas using the output of the upstream $O_2$ sensor 4. This is the basic flow of the purification action or catalytic action.

Heaters are provided at the upstream $O_2$ sensor 4, the A/F sensor 6 which is the intermediate sensor and the downstream $O_2$ sensor 7, respectively. Those sensors are set to be activated prior to the activation of the three way catalyst 3.

With the above-stated structure, the inventor of the present invention made various examinations in order to determine the deterioration degree of the HC adsorbing catalyst 5 which is the second catalyst in the downstream, without depending on the deterioration degree of the first catalyst or the three way catalyst 3, and obtained the following results.

To be specific, the air-fuel ratio feedback control of the air-fuel ratio of the intake gas was changed to be conducted based on the output of the downstream $O_2$ sensor 7 from based on the output of the upstream $O_2$ sensor 4. The different deterioration degrees of the three way catalyst 3 and those of the HC adsorbing catalyst 5 are in turn combined and the output of the intermediate sensor or the A/F sensor 6 was thereby analyzed. It is noted that the deterioration degree of the three way catalyst 3 was evaluated, corresponding to the $O_2$ storage capability of the three way catalyst 3 and that of the HC adsorbing catalyst was evaluated, corresponding to the $O_2$ storage capability of the HC adsorbing catalyst.

These analysis results are shown in FIGS. 3A through 6C. FIG. 3B particularly indicates the output of the intermediate sensor or A/F sensor 6 if the deterioration degree of the three way catalyst 3 is high and that of the HC adsorbing catalyst 5 is high. FIG. 4B indicates the output of the intermediate sensor or A/F sensor 6 if the deterioration degree of the three way catalyst 3 is high and that of the HC adsorbing catalyst 5 is low. FIG. 5B indicates the output of the intermediate sensor or A/F sensor 6 if the deterioration degree of the three way catalyst 3 is low and that of the HC adsorbing catalyst 5 is high. FIG. 6B indicates the output of the intermediate sensor or A/F sensor 6 if the deterioration degree of the three way catalyst 3 is low and the that of the HC adsorbing catalyst 5 is low.

Figures 3A, 3B:
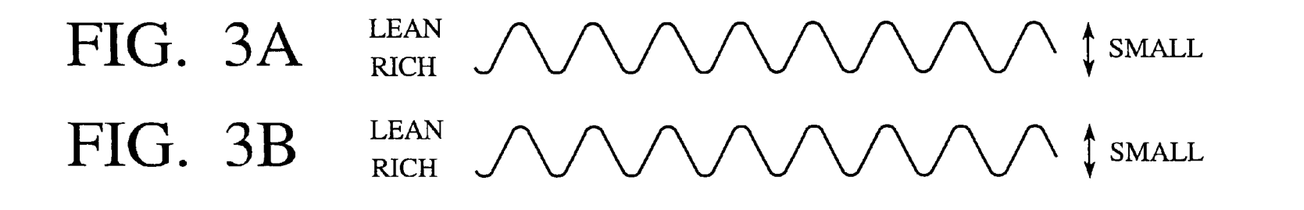
FIGS. 3A through 3C are views showing outputs of sensors in this embodiment.
Figure 3C:
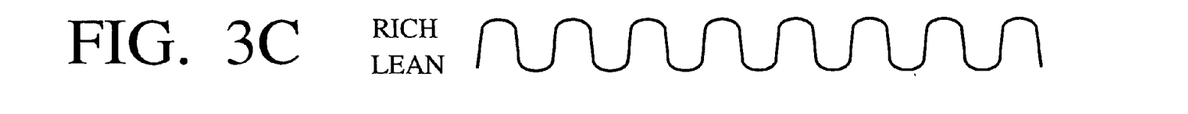
Figure 5A:
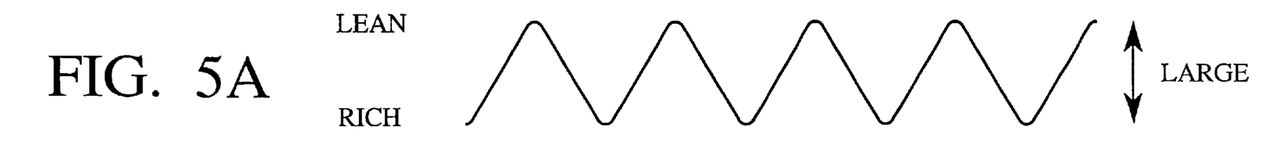
FIGS. 5A through 5C are views showing outputs of sensors in this embodiment.
Figure 5B:
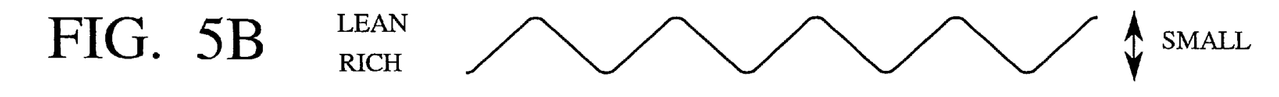
Figure 5C:
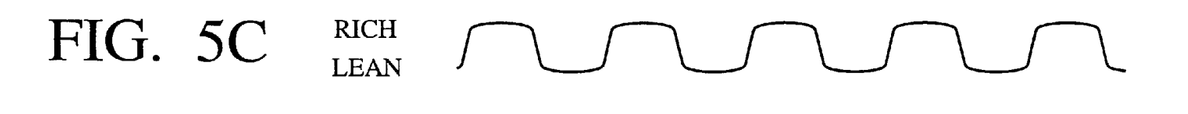

From FIGS. 3B and 5B, if the deterioration degree of the HC adsorbing catalyst 5 is high, a peak-to-peak between a peak on the rich side of the air-fuel ratio of the exhaust gas and a peak on the lean side thereof in the output waveform of the intermediate sensor or A/F sensor 6, that is, the air-fuel ratio amplitude of the exhaust gas in the downstream of the three way catalyst 3 and in the upstream of the HC adsorbing catalyst 5 is small without depending on the deterioration degree of the three way catalyst 3.

Figures 4A, 4B:
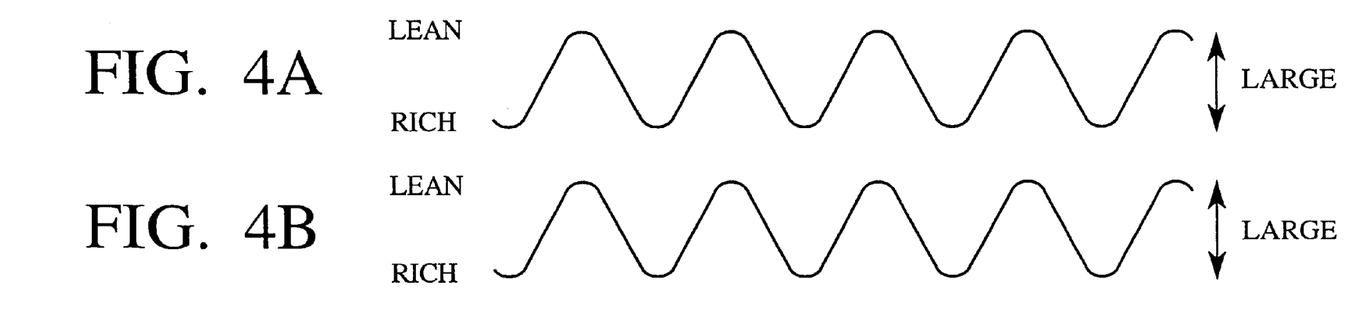
FIGS. 4A through 4C are views showing outputs of sensors in this embodiment.
Figure 4C:
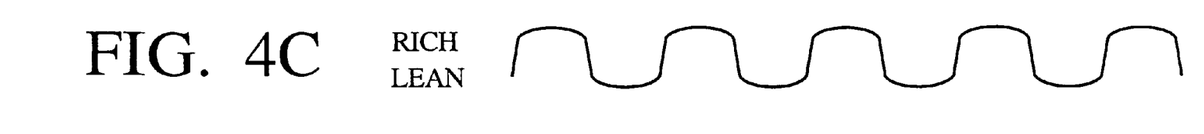
Figure 6A:
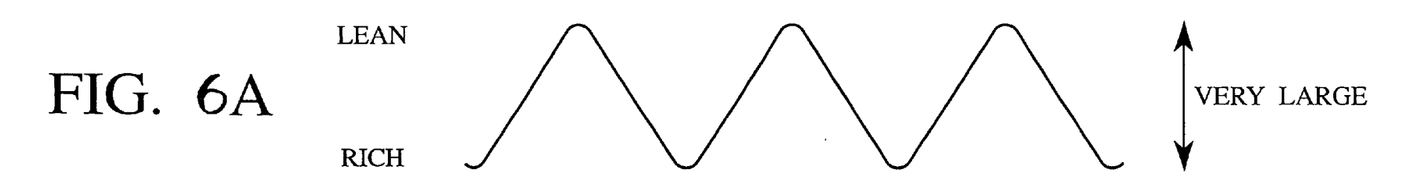
FIGS. 6A through 6C are views showing outputs of sensors in this embodiment.
Figure 6B:
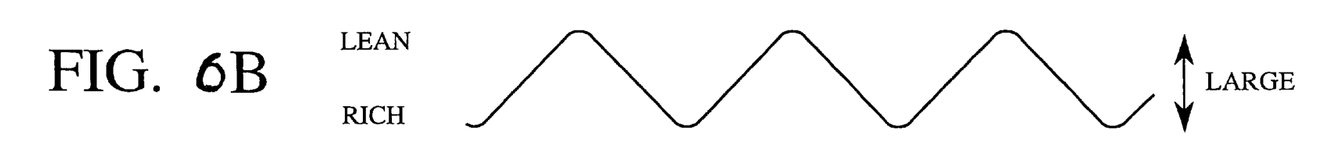
Figure 6C:
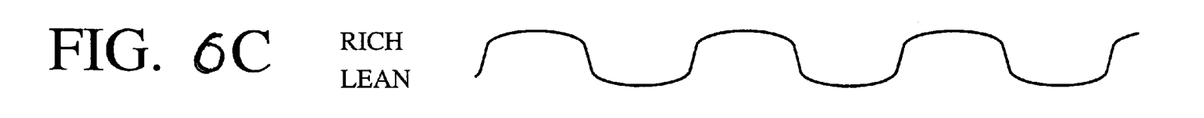

Meanwhile, from FIGS. 4B and 6B, if the deterioration degree of the HC adsorbing catalyst 5 is low, a peak-to-peak between a peak on the rich side of the air-fuel ratio of the exhaust gas and a peak on the lean side thereof in the output waveform of the intermediate sensor or A/F sensor 6, that is, the air-fuel ratio amplitude of the exhaust gas in the downstream of the three way catalyst 3 and in the upstream of the HC adsorbing catalyst 5 is large without depending on the deterioration degree of the three way catalyst 3.

The following is therefore understood from those analysis results. If air-fuel ratio feedback controlling of the air-fuel ratio of the intake gas is conducted based on the output of the downstream $O_2$ sensor 7 and the deterioration degree of the HC adsorbing catalyst 5 is high, then the air-fuel ratio amplitude of the exhaust gas in the downstream of the three way catalyst 3 and in the upstream of the HC adsorbing catalyst 5 by the intermediate sensor or A/F sensor 6 is small, irrespectively of the deterioration degree of the three way catalyst 3. If the deterioration degree of the HC adsorbing catalyst 5 is low, then the air-fuel ratio amplitude of the exhaust gas in the downstream of the three way catalyst 3 and in the upstream of the HC adsorbing catalyst 5 by the intermediate sensor or A/F sensor 6 is large, irrespectively of the deterioration degree of the three way catalyst 3.

In other words, it was found out that if the air-fuel ratio amplitude of the exhaust gas in the downstream of the three way catalyst 3 and in the upstream of the HC adsorbing catalyst 5 is measured and the magnitude of the amplitude is determined while air-fuel ratio feedback controlling the air-fuel ratio of the intake gas based on the output of the $O_2$ sensor 7 in the downstream of the HC adsorbing catalyst 5, then the deterioration degree of the HC adsorbing catalyst 5 can be determined without giving the influence of the deterioration degree of the three way catalyst 3 to such a determination of the HC adsorbing catalyst 5.

In more general sense, the deterioration degree of the $O_2$ storage capability of the catalyst located in the downstream of the exhaust passage of the engine can be measured and determined, without depending on the deterioration degree of the $O_2$ storage capability of the catalyst located in the upstream of the exhaust passage of the engine.

For reference, FIGS. 3A, 4A, 5A and 6A show output waveforms obtained by measuring the air-fuel ratio of the exhaust gas in the upstream of the three way catalyst 3 using the same A/F sensor as the intermediate sensor or A/F sensor 6 while air-fuel ratio feedback controlling the air-fuel ratio of the intake gas based on the output of the $O_2$ sensor in the downstream of the HC adsorbing catalyst 5. According to the measurement results shown therein, the air-fuel ratio of the exhaust gas in the upstream of the three way catalyst 3 has nothing to do with the deterioration degree of the HC adsorbing catalyst 5 and it cannot be used for determining the deterioration degree of the HC adsorbing catalyst 5 which is the catalyst in the downstream.

For another reference, FIGS. 3C, 4C, 5C and 6C show the output waveforms of the $O_2$ sensor 7 in the downstream of the HC adsorbing catalyst 5 being used while air-fuel ratio feedback controlling the air-fuel ratio of the intake gas. The output waveforms of the $O_2$ sensor 7 in the downstream are obtained by, so to speak, binary-detecting whether the air-fuel ratio of the exhaust gas is on the rich side or on the lean side in relation to the theoretical air-fuel ratio of the exhaust gas. As is seen from these figures, the air-fuel ratio feedback controlling of the air-fuel ratio of the intake gas can be accurately conducted to determine the deterioration degree of the HC adsorbing catalyst 5 without using an A/F sensor for detecting the air-fuel ratio of the exhaust gas substantially linearly.

That is to say, in the deterioration determination apparatus for the exhaust emission control device in this embodiment, based on novel technical knowledge obtained from the above-stated analysis results, to determine the deterioration of the HC adsorbing catalyst or the like which is the second catalyst provided in the downstream of the exhaust gas, when predetermined deterioration determination conditions have been satisfied, the sensor for conducting air-fuel ratio feedback control to the intake mixture gas is switched from the $O_2$ sensor 4 in the upstream to the $O_2$ sensor 7 in the downstream. While the air-fuel ratio feedback control block 21 conducts air-fuel ratio feedback control to the intake mixture gas based on the output of the downstream $O_2$ sensor 7, the air-fuel ratio amplitude measurement block 22 measures the air-fuel ratio amplitude of the exhaust gas in the upstream of the HC adsorbing catalyst 5 from the output of the intermediate sensor or A/F sensor 6. When the inversion frequency at the output of the intermediate sensor or A/F sensor 6 reaches a predetermined value, the deterioration determination block 23 obtains the average of the air-fuel ratio amplitude of the exhaust gas in the upstream of the HC adsorbing catalyst 5 from the measured output of the intermediate sensor or A/F sensor 6. If the average is equal or lower than the predetermined value, the deterioration determination block 23 determines that the HC adsorbing catalyst 5 is deteriorated.

A series of processing conducted in the blocks 21 to 23 of the controller 9 in the deterioration determination apparatus for the exhaust emission control device in this embodiment will be described in more detail while using a flowcharts and the like.

It is noted that the processing for obtaining the air-fuel ratio amplitudes ΔA/F of the exhaust gas in the upstream of the HC adsorbing catalyst 5 is relevant to processing in the air-fuel ratio amplitude measurement block 22. The processing for determining that the HC adsorbing catalyst 5 deteriorates is relevant to processing in the deterioration determination block 23.

Figure 7:
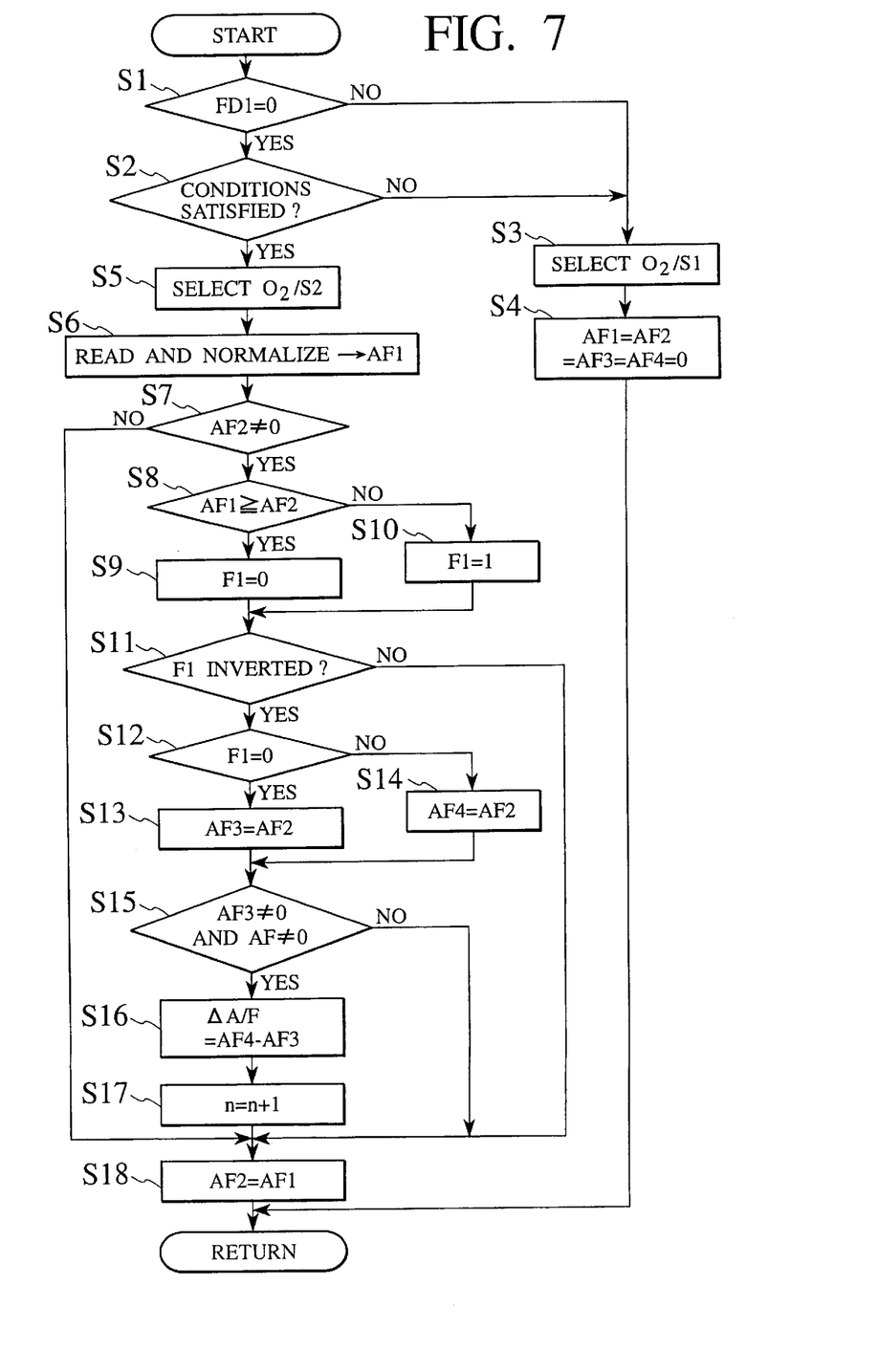
FIG. 7 is a flowchart for obtaining the amplitude of an air-fuel ratio in this embodiment.

The flowchart shown in FIG. 7 is to calculate the air-fuel ratio amplitude ΔA/F of the exhaust gas in the exhaust pipe 2 between the three way catalyst 3 and the HC adsorbing catalyst 5. Process is executed for every input of an REF signal (which is a signal rising at every reference point of the crank angle). It is noted that the REF signal is outputted from the crank angle sensor 8 and inputted into the air-fuel ratio amplitude measurement block 22.

First, in steps 1 and 2, it is respectively determined whether conditions for a deterioration determination end flag FD1 and those for the HC adsorbing catalyst 5 are satisfied.

The deterioration determination end flag FD1 is a flag which is turned into "0" (or initialized) when a starter switch returns from an ON position to an OFF position after rotated to the ON position to ignite the engine. The flag FD1 is stored in an RAM within the control unit 9.

The deterioration determination conditions involve those, for example, such that air-fuel ratio feedback control conditions in the air-fuel ratio feedback control block 21 are satisfied and that the HC adsorbing catalyst 5 is activated (at an exhaust temperature of, for example, 400° C. or higher). In this embodiment, if these conditions are satisfied, the conditions for deterioration determination are satisfied.

Next, when the deterioration determination end flag FD1 is FD1=1 or the deterioration determination conditions are not satisfied, process goes on to steps 3 and 4. In these steps 3 and 4, the $O_2$ sensor 4 (denoted simply as $O_2$/S1) in the upstream of the three way catalyst 3 is selected and an initial value 0 is inputted into variables AF1, AF2, AF3 and AF4 for use in deterioration determination, respectively, thereby completing the process this time.

If the air-fuel ratio feedback control conditions are satisfied, the air-fuel ratio feedback control block 21 use the $O_2$ sensor 4 and conducts air-fuel ratio feedback control based on the output of the $O_2$ sensor 4 in the upstream of the three way catalyst in accordance with a predetermined flowchart (not shown). The reason for inputting the initial value 0 into the variables AF1, AF2, AF3 and AF4, respectively, is that the determination of the HC adsorbing catalyst is not conducted when the $O_2$ sensor 4 in the upstream of the three way catalyst is selected.

Now, the procedure at the cold start of the engine 1 will be described in more detail as follows.

First, the $O_2$ sensor 4, the A/F sensor 6 and the $O_2$ sensor 7 are equipped with heaters, respectively. So the sensors 4, 6 and 7 are first activated.

Next, when the $O_2$ sensor 4 in the upstream has been activated, air-fuel ratio feedback control starts based on the output of the upstream $O_2$ sensor 4 in the air-fuel ratio feedback control block 21.

Furthermore, when the HC adsorbing catalyst 5 has been activated, the deterioration determination conditions are satisfied.

When the deterioration determination end flag FD1 is FD1=0 and the deterioration determination conditions have been met, process goes on to a step 5. In the step 5, the $O_2$ sensor 7 (denoted simply by $O_2$/S2) in the downstream of the HC adsorbing catalyst 5 is selected. Air-fuel ratio feedback control, which has been conducted based on the output of the $O_2$ sensor 4 in the upstream of the three way catalyst 3, is now conducted based on the output of the $O_2$ sensor 7 in the downstream of the HC adsorbing catalyst 5 in the air-fuel ratio feedback control block 21.

To measure an air-fuel ratio amplitude between the three way catalyst 3 and the HC adsorbing catalyst 5 during air-fuel feedback controlling based on the output of the $O_2$ sensor 7 in the downstream of the HC adsorbing catalyst 5, the output of the A/F sensor 6 is read and then normalized in a step 6. The normalized value is inputted into the AF1 and stored in a RAM within the control unit 9.

Figure 8:
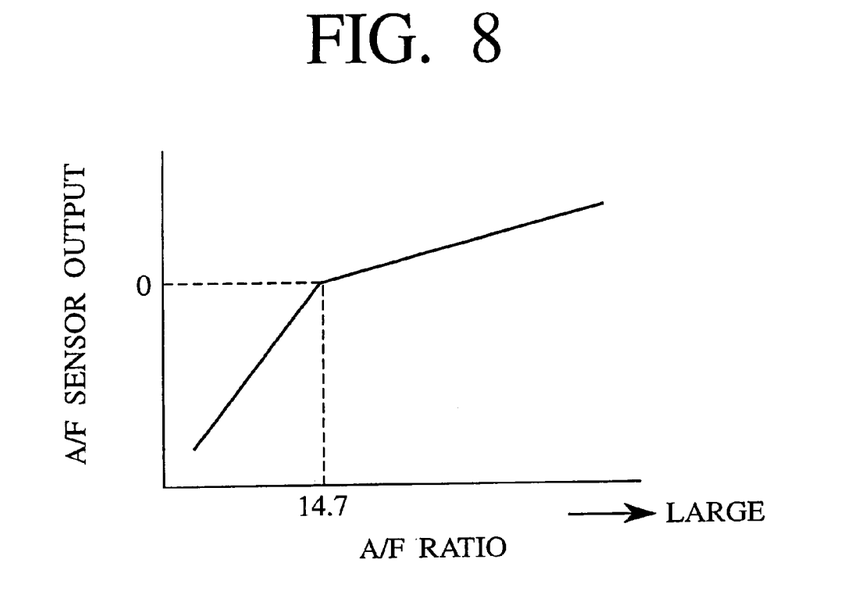
FIG. 8 shows the relationship between the output of the A/F sensor and the air-fuel ratio in this embodiment.
Figure 9:
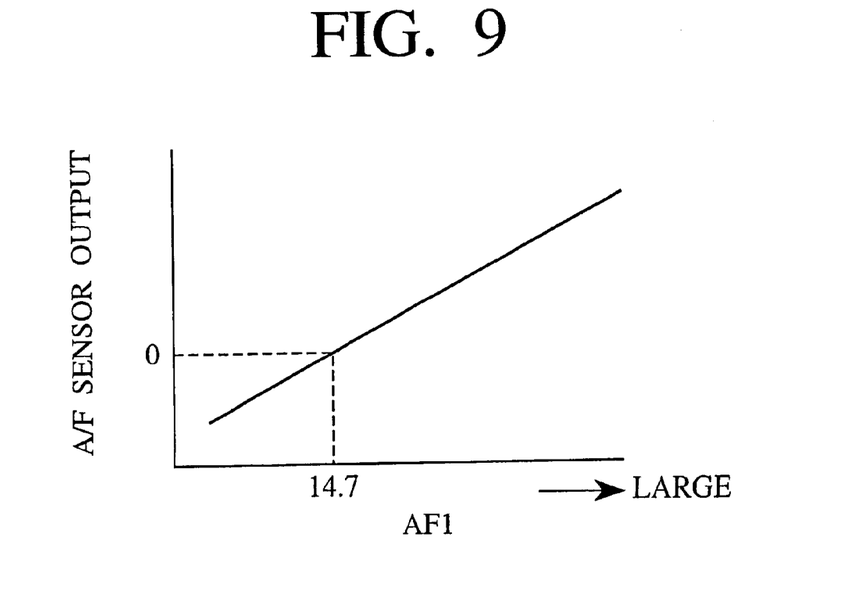
FIG. 9 shows the relationship between the output of the A/F sensor and a normalized value in this embodiment.

The relationship between the output of the A/F sensor 6 and the air-fuel ratio and that between the output of the A/F sensor 6 and the normalized value AF1 are shown in FIGS. 8 and 9, respectively. As can be seen from FIG. 9, the normalized value AF1 is a value which exhibits such a feature that the output of the A/F sensor 6 is higher as the air-fuel ratio is closer to the lean side.

Next, in a step 7, AF2 which is a value prior to the normalized AF1 is compared with 0. If the process goes to the step 7 for the first time after starting the engine 1, a value prior to the normalized AF1 is not stored in the AF2 yet (that is, AF2=0) and therefore process goes on to a step 18. In the step 18, the value of the normalized value AF1 is transferred to the AF2 and stored in a RAM within the control unit 9, and the process this time is finished.

When AF2≠0 (that is, a value prior to the normalized AF1 is stored in the AF2), process goes from the step 7 to a step 8. In the step 8, the normalized value AF1 and the AF2 which is a value prior to the normalized value AF1 are compared to determine whether the normalized value AF1 (i.e., an air-fuel ratio) increases or decreases. When AF1≧AF2, process goes on to a step 9, "0" is inputted into a flag F1 and, when AF1<AF2, process goes on to a step 10 and "1" is inputted into the flag F1 and stored in a RAM within the control unit 9. F1=0 indicates the increase of the air-fuel ratio and F1=1 indicates the decrease of the air-fuel ratio.

Next, In a step 11, it is determined whether the flag F1 is inverted. If not inverted, the step 18 is executed and this process is ended. If inverted, a value of the flag F1 is checked in a step 12. If F1=0 (that is, the F1 is inverted from "1" to "0"), process goes on to a step 13. In the step 13, the value of the AF2 is transferred to AF3. If F1=1 (that is, the F1 is inverted from "0" to "1"), the process goes on to a step 14 and the value of the AF2 is transferred to AF4. The value of AF2 at timing at which F1=0 (the air-fuel ratio is on the increase) this time and F1=1 (the air-fuel ratio is on the decrease) previously is the minimal value of the air-fuel ratio. The value of the AF2 at timing at which F1=1 (the air-fuel ratio is on the decrease) this time and F1=0 (the air-fuel ratio is on the increase) previously is the maximal value of the air-fuel ratio. That is, the minimal value of the air-fuel ratio and a maximal of the air-fuel ratio are inputted into the AF3 and AF4, respectively and stored in a RAM within the control unit 9.

In a step 15, it is affirmed that neither the minimal value AF3 nor the maximal value AF4 is 0. Thereafter, in a step 16, the air-fuel ratio amplitude ΔA/F is calculated from a formula of ΔA/F=AF4−AF3. The calculated value is stored in a RAM within the control unit 9. Memories of a predetermined number "a" (which corresponds to a specified value "a" to be described later in a step 24 of FIG. 10) are prepared for storing the air-fuel ratio amplitude ΔA/F. The calculated values are sequentially stored for every inversion of the output of the A/F sensor in due order. Those memories are required to calculate the average of the air-fuel ratio amplitudes ΔA/F.

Next, in a step 17, the inversion frequency n (the initial value is 0) of the output of the A/F sensor 6 is incremented. Finally, a step 18 is executed and this process is ended.

Figure 10:
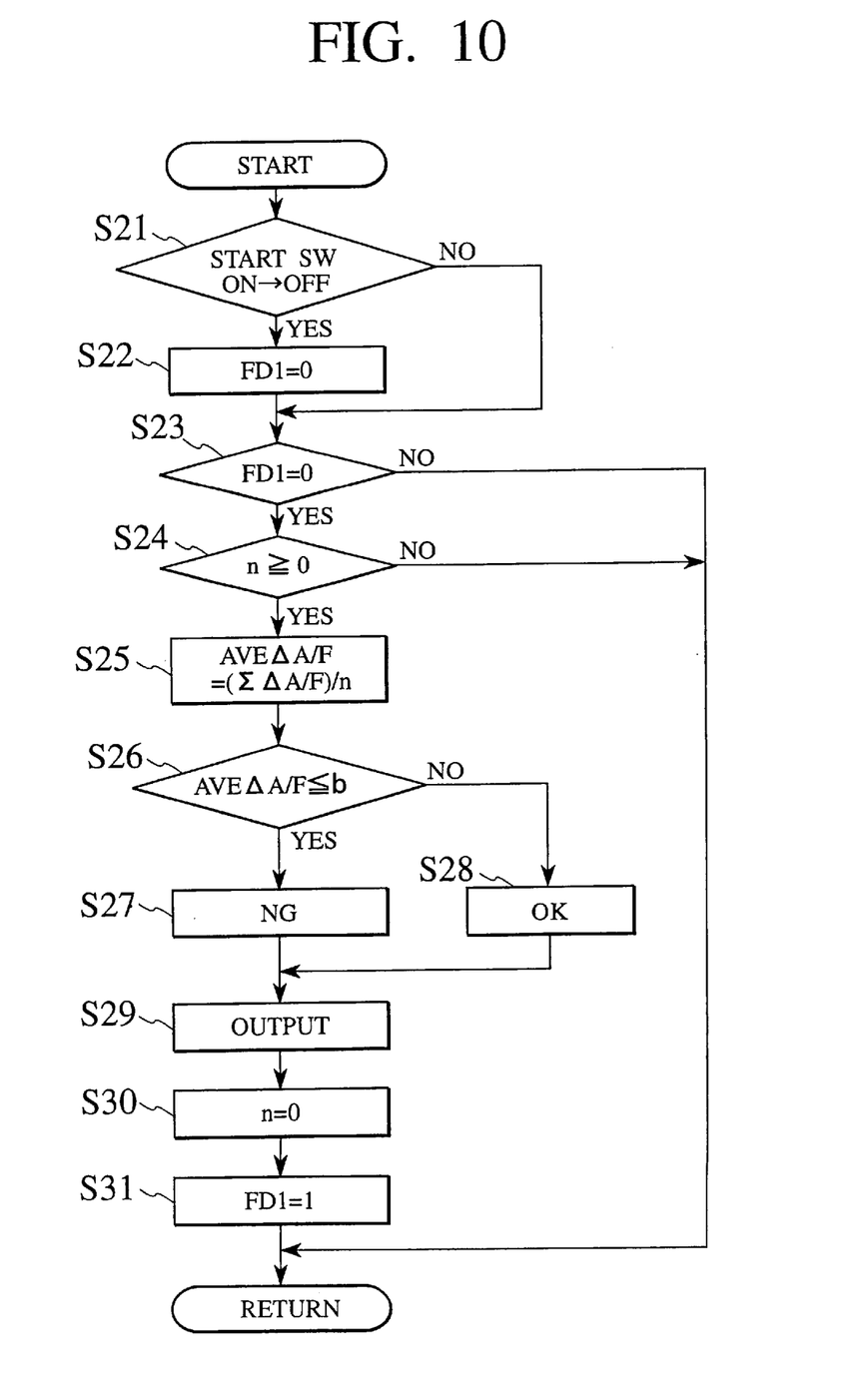
FIG. 10 is a flowchart for making deterioration determination in this embodiment.

In the meantime, the flowchart shown in FIG. 10 is provided to determine whether the HC adsorbing catalyst 5 deteriorates and is executed every time the above-stated REF signal is inputted, independent of the flow of FIG. 7.

First, in a step 21, while observing the starter switch, only if the starter switch returns from an OFF position after the starter reaches an ON position to ignite the engine 1, process goes on to a step 22. In the step 22, "0" is inputted into the deterioration determination end flag FD1. The flag FD1 is stored in the RAM within the control unit 9.

Next, in a step 23, with the flag FD1 noted, only when FD1=0, process goes on to a step 24. In the step 24, the inversion frequency n of the A/F sensor output as described above and the specified value "a" are compared. If the inversion frequency n is less than "a", this process is ended. If n≧a, the process goes on to a step 25. In the step 25, the average AVEΔA/F of the ΔA/F is calculated from a formula of AVEΔA/F=(ΣΔA/F)/n. In a step 26, the calculated value is compared with a predetermined value b. If AVEΔA/F≦b, process goes on to a step 27 where it is determined that the HC adsorbing catalyst 5 deteriorates. If AVEΔA/F>b, the process goes on to a step 28 where it is determined that the HC adsorbing catalyst 5 is normal or does not deteriorate. The process then goes on to a step 29, and a determination result is outputted to the indicator 12.

Next, in steps 30 and 31, an initial value 0 is inputted into the inversion frequency n and "1" is inputted into the deterioration determination end flag FD1, and this process is finished. As described above, if FD1=1, the process cannot go on to the step 24 and the following in the flowchart of FIG. 10 or the step 2 and the following in the flowchart of FIG. 7. In other words, the deterioration determination of the HC adsorbing catalyst 5 is designed to be conducted only once after starting the engine 1.

After the determination is finished, the $O_2$ sensor 4 in the upstream of the three way catalyst 3 is selected (step 1 to step 3 in FIG. 7) and air-fuel ratio feedback control is conducted based on the output of the $O_2$ sensor 4 in the upstream of the three way catalyst 3 in the air-fuel ratio feedback control block 21.

As described above, in this embodiment, the three way catalyst 3 and the HC adsorbing catalyst 5 are sequentially disposed in the upstream of the exhaust pipe 2. The HC within the exhaust is adsorbed by the HC adsorbing catalyst 5 with the three way catalyst 3 being in an inert state at low temperature. Thereafter, at timing at which the adsorbing catalyst 5 is activated, the HC adsorbed by the adsorbing catalyst 5 is purified. And at the same time, the A/F sensor 6 and the $O_2$ sensor 7 are respectively disposed between the three way catalyst 3 and the adsorbing catalyst 7 and in the downstream of the adsorbing catalyst 5. When deterioration determination conditions are satisfied, the amplitude of the air-fuel ratio of the exhaust gas between the three way catalyst 3 and the HC adsorbing catalyst 5 is measured using the output of the A/F sensor 6 while air-fuel ratio feedback controlling is being conducted based on the output of the $O_2$ sensor 7 in the downstream of the HC adsorbing catalyst 5. Based on the amplitude of the air-fuel ratio of the exhaust gas, it is determined whether the HC adsorbing catalyst 5 deteriorates. Thus, it is possible to conduct deterioration determination of only the HC adsorbing catalyst 5 with a less inversion frequency in the early time, irrespectively of the deterioration degree of the three way catalyst 3 located in the upstream of the HC adsorbing catalyst 5. It is therefore possible to efficiently improve the accuracy of the deterioration determination of the HC adsorbing catalyst 5.

Now, description will be given to the second embodiment of the deterioration determination apparatus for the exhaust emission control device according to the present invention. A flowchart shown in FIG. 11 basically corresponds to that in FIG. 10 in the first embodiment. The same step numbers denote the same steps as those in FIG. 10.

In the first embodiment, as the specified value "a" is larger, the accuracy of calculating the average AVEΔA/F of the amplitude of the air-fuel ratio of the exhaust gas is higher but, on the other hand, determination timing is delayed.

Figure 11:
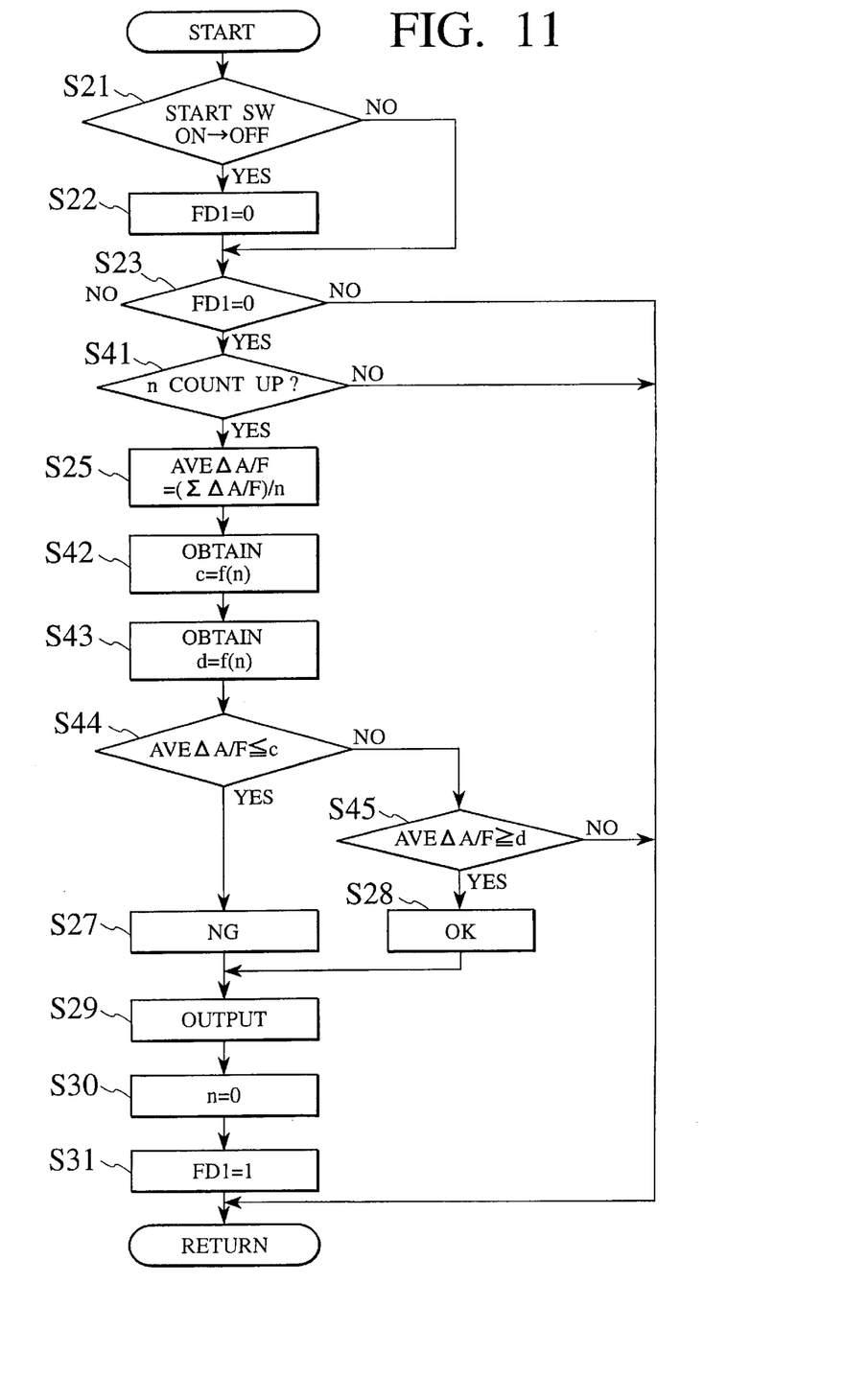
FIG. 11 is a flowchart for making deterioration determination in the second embodiment of the deterioration determination apparatus for the exhaust emission control device used for the internal combustion engine according to the present invention.

In considering the above, in this embodiment, for purposes of ending such a determination as early as possible, a part of the deterioration determination processing in the first embodiment is modified to thereby calculate an average of the air-fuel ratio amplitude every time the output of the A/F sensor 6 is inverted. In addition, a pair of determination values (an NG determination value c and an OK determination value d as shown in FIG. 11) having dispersed widths (which become larger as the inversion frequency is smaller) are set for every inversion of the output of the A/F sensor 6. By comparing the air-fuel ratio amplitude average with the paired determination values (c and d (d≧c)), it is determined that the catalyst deteriorates if the average is not more than the NG determination value c and that the catalyst is normal if the average is not less than the OK determination value d.

Figure 12:
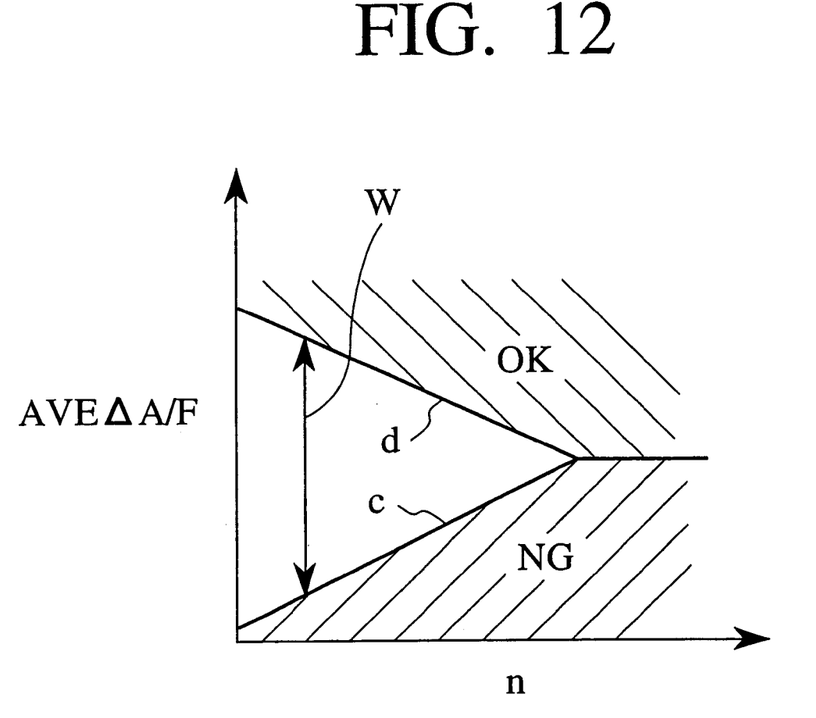
FIG. 12 is a characteristic view for making deterioration determination using a pair of determination values in this embodiment.

The steps of FIG. 11 different from those in FIG. 10 will be mainly described. In a step 41, while the inversion number n is noted, only when the inversion number n is counted up (that is, every time the output of the A/F sensor 6 is inverted), process goes on to a step 25. In the step 25, the average AVE ΔA/F of the air-fuel ratio amplitude is calculated. In steps 42 and 43, a table the content of which is as illustrated by FIG. 12 (stored in a ROM within the control unit 9) is retrieved from the inversion frequency n and an NG determination value (the first determination value) c and an OK determination value (the second determination value) d (d≧c) are obtained. In steps 44 and 45, the average AVEΔA/F is compared with these determination values c and d. If AVEΔA/F≦c, the process goes onto a step 27, where it is determined that a deterioration occurs. If AVEΔA/F does not satisfy the both relationships one of which is not AVEΔA/F≦c and one of which is AVEΔA/F≧d, then the process goes on to a step 28 and it is determined that no deterioration occurs or the catalyst is normal. By comparison, if c<AVEΔA/F<d, then the process this time is ended without conducting any determination.

It is noted here that a vertical width between the c and d in an area in which c and d do not coincide with each other in FIG. 12 is the dispersed width generated in the air-fuel ratio amplitude. The width indicates that as the inversion frequency n of the output of the A/F sensor 6 is smaller, the dispersed width is larger. If, therefore, the average AVEΔA/F of the air-fuel ratio amplitude fall within this dispersed width, it cannot be determined the catalyst is normal or deteriorates. If, however, for example, at a time when the initial air-fuel ratio amplitude is calculated (in which case, n=1 and therefore, AVEΔA/F=ΔA/F) and the air-fuel ratio amplitude is equal to or less than c, or equal to or more than d, then a determination is conducted. At this timing, the determination is ended.

As described above, in this embodiment, the air-fuel ratio amplitude average is calculated every time the output of the A/F sensor 6 is inverted and the pair of determination values having the dispersed width are set every time the output of the A/F sensor is inverted. Comparison of the air-fuel ratio amplitude average with the paired determination values leads to deterioration determination. That is, if the air-fuel ratio amplitude average is not more than the NG determination value, it is determined that a deterioration occurs. If the average is not less than the OK determination value, it is determined that no deterioration occurs or the catalyst is normal. Thus, the determination can be ended earlier. Owing to this, the control can be switched early to air-fuel ratio feedback control based on the output of the $O_2$ sensor 4 in the upstream of the three way catalyst 3, thereby ensuring high purification performance by the three way catalyst 3.

While the description has been given to a case where a simple average is obtained for air-fuel ratio amplitudes in this embodiment, the weighted mean method can be also employed.

In the embodiments described so far, description has been given to a case where the three way catalyst 3 is in the upstream. It goes without saying that the HC adsorbing catalyst instead of the three way catalyst may be provided in the upstream. This is because the function and advantage of the adsorbing catalyst in the upstream are almost the same as those of the three way catalyst. Likewise, a three way catalyst instead of the HC absorbing catalyst may be provided in the downstream.

In the embodiments described so far, description has been given to a case where inexpensive $O_2$ sensors 4 and 7 are provided in the upstream of the three way catalyst 3 and in the downstream of the HC adsorbing catalyst 5, respectively for allowing air-fuel ratio feedback control. A/F sensors instead of the $O_2$ sensors, may be of course used.

Moreover, in the embodiments, the injector 11 for use in the controlling of the air-fuel ratio of the intake mixture gas supplied to the engine 1 may be designed to eject fuel to the intake pipe 10 or directly eject fuel into the combustion chamber of the engine 1.

Furthermore, in the embodiments described so far, description has been given to a case where the blocks 21 to 23 are provided within a CPU in the control unit 9 separately from one another. Needless to say, they may be provided integrally with one another within one chip of the CPU.

The contents of Application No. TOKUGANHEI 9-358754, with a filling date of Dec. 26, 1997 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A deterioration determination apparatus for an exhaust emission control device used for an internal combustion engine, the exhaust emission control device for the internal combustion engine comprising a first catalyst, arranged in an exhaust passage of the internal combustion engine and conducting a catalytic action in relation to exhaust gas passed through the exhaust passage, and a second catalyst, arranged in a downstream of the first catalyst in the exhaust passage of the internal combustion engine and conducting a catalytic action in relation to the exhaust gas passed through the exhaust passage, the deterioration determination apparatus comprising:

a first sensor, arranged between the first catalyst and the second catalyst in the exhaust passage of the internal combustion engine and detecting information about an air-fuel ratio of the exhaust gas passed through the exhaust passage;

a second sensor, arranged in a downstream of the second catalyst in the exhaust passage of the internal combustion engine and detecting information about an air-fuel ratio of the exhaust gas passed through the exhaust passage;

control means for feedback controlling an air-fuel ratio of mixture gas supplied to the internal combustion engine, based on the information detected by the second sensor;

measurement means for measuring an amplitude of the air-fuel ratio of the exhaust gas from the information detected by the first sensor while the control means is conducting feedback control; and determination means for determining whether the second catalyst deteriorates based on the amplitude of the air-fuel ratio measured by the measurement means.

2. A deterioration determination apparatus according to claim 1, wherein the determination means determines, by comparing an average of the amplitude of the air-fuel ratio with a predetermined reference value, that the second catalyst deteriorates if the average of the amplitude is equal to or less than the predetermined reference value.

3. A deterioration determination apparatus according to claim 1, wherein the determination means determines, by comparing an average of the amplitude obtained every time the amplitude of the air-fuel ratio is inverted with a predetermined pair of determination values, that the second catalyst deteriorates if the average of the amplitude is equal to or less than a smaller value of the pair of determination values and that the second catalyst does not deteriorate if the average of the amplitude is equal to or more than a larger value of the pair of determination values.

4. A deterioration determination apparatus according to claim 1, wherein the second catalyst adsorbs HC of the exhaust gas passed through the exhaust passage when a temperature of the second catalyst is low and desorbs HC adsorbed by the second catalyst when the temperature of the second catalyst is high, and the catalytic action of the second catalyst is a catalytic action of purifying HC adsorbed by the second catalyst when the temperature of the second catalyst is equal to or more than a catalyst activation temperature of the second catalyst.

5. A deterioration determination apparatus according to claim 1, wherein the second catalyst adsorbs HC of the exhaust gas passed through the exhaust passage when a temperature of the second catalyst is low and desorbs HC of the exhaust gas passed through the exhaust passage when the temperature of the second catalyst is high, and the catalytic action of the second catalyst is a catalytic action of purifying HC, CO and $NO_x$ when the temperature of the second catalyst is equal to or more than a catalyst activation temperature of the second catalyst.

6. A deterioration determination apparatus according to claim 1, wherein the catalytic action of the first catalyst is a catalytic action of purifying HC, CO and $NO_x$ when a temperature of the first catalyst is equal to or more than a catalyst activation temperature of the first catalyst.

7. A deterioration determination apparatus according to claim 1, wherein the first catalyst adsorbs HC of the exhaust gas passed through the exhaust passage when a temperature of the first catalyst is low and desorbs HC of the exhaust gas passed through the exhaust passage when the temperature of the first catalyst is high, and the catalytic action of the first catalyst is a catalytic action of purifying HC, CO and $NO_x$ when the temperature of the first catalyst is equal to or more than a catalyst activation temperature of the first catalyst.

8. A deterioration determination apparatus according to claim 1, wherein the first sensor substantially linearly detects the air-fuel ratio of the exhaust gas passed through the exhaust passage.

9. A deterioration determination apparatus according to claim 1, wherein the second sensor detects whether the air-fuel ratio of the exhaust gas passed through the exhaust passage is on a rich side or on a lean side with respect to a theoretical air-fuel ratio of the exhaust gas.

* * * * *